United States Patent
Tsujimoto

(10) Patent No.: US 8,244,111 B2
(45) Date of Patent: Aug. 14, 2012

(54) OPTICAL DISK DEVICE

(75) Inventor: Satoshi Tsujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 368 days.

(21) Appl. No.: 12/686,432

(22) Filed: Jan. 13, 2010

(65) Prior Publication Data

US 2010/0183284 A1    Jul. 22, 2010

(30) Foreign Application Priority Data

Jan. 16, 2009  (JP) ................................. 2009-007922

(51) Int. Cl.
    *H04N 5/92* (2006.01)
(52) U.S. Cl. ....................................................... 386/338
(58) Field of Classification Search ........................ None
    See application file for complete search history.

(56) References Cited

U.S. PATENT DOCUMENTS

2007/0263985 A1 * 11/2007 Ikeda et al. ..................... 386/96

FOREIGN PATENT DOCUMENTS

| EP | 0 952 578 A2 | 10/1999 |
|----|---|---|
| EP | 1 638 327 A1 | 3/2006 |
| EP | 1 708 485 A1 | 10/2006 |
| EP | 1 710 799 A1 | 10/2006 |
| EP | 1 783 769 A1 | 5/2007 |
| EP | 1 921-622 A2 | 5/2008 |
| JP | 2008-052887 A | 3/2008 |

* cited by examiner

*Primary Examiner* — Huy T Nguyen
(74) *Attorney, Agent, or Firm* — Global IP Counselors

(57) ABSTRACT

An optical disk device includes a reproduction component, an output component and a control component. The reproduction component directs a laser beam at an optical disk that is loaded in the optical disk device with the optical disk storing a plurality of audio data streams in a plurality of different acoustic qualities. The reproduction component reproduces one of the audio data streams. The output component outputs the one of the audio data streams to an amplifier. The control component acquires from the amplifier first audio format information indicating audio formats to which the amplifier corresponds, and acquires from the reproduction component second audio format information indicating audio formats of the audio data streams stored in the optical disk. The control component determines the one of the audio data streams with an audio format that belongs to both the first audio format information and the second audio format information.

10 Claims, 6 Drawing Sheets

| AUDIO FORMAT RECORDED TO OPTICAL DISK | JAPANESE | ENGLISH |
|---|---|---|
| DTS-HD Master | ○ | × |
| DOLBY TRUE HD | ○ | ○ |
| ........ | ........ | ........ |

OPTICAL DISK DEVICE

CROSS-REFERENCE TO RELATED APPLICATIONS

This application claims priority to Japanese Patent Application No. 2009-007922 filed on Jan. 16, 2009. The entire disclosure of Japanese Patent Application No. 2009-007922 is hereby incorporated herein by reference.

BACKGROUND

1. Field of the Invention

The present invention generally relates to an optical disk device. More specifically, the present invention relates to an optical disk device that reproduces an audio data stream selected from among a plurality of audio data streams recorded to an optical disk.

2. Background Information

A conventional optical disk device that reproduces video or audio recorded on a Blu-ray disc or other such optical disk has seen practical application, and has become popular. When an optical disk records a foreign movie or the like, the optical disk also records audio in a plurality of different acoustic qualities corresponding to the function of an amplifier connected to the optical disk device. For example, with a Blu-ray disc, the audio in a plurality of different acoustic qualities includes DTS-HD Master Audio of the highest acoustic quality, Dolby TrueHD of the second-highest quality, and so forth. DTS stands for Digital Theater System, and is a standard that came after Dolby Digital. A plurality of audio data streams is recorded to the optical disk in order to reproduce audio in a plurality of different acoustic qualities.

The optical disk device generally reproduces a menu screen prior to the reproduction of the main content when an optical disk to which a plurality of audio data streams have been recorded is placed in a main body of the optical disk device. The user uses the menu screen to select the acoustic quality to be reproduced. Then, the optical disk device reproduces, via the amplifier, the audio data stream selected by the user from among the plurality of audio data streams recorded to the optical disk. This allows the user to hear the audio of the desired acoustic quality from a speaker connected to the amplifier.

Furthermore, an audio/video reproduction device has been proposed (see Japanese Laid-Open Patent Application Publication No. 2008-52887, for example).

However, a user often does not select the acoustic quality to be reproduced because the user does not want to take the trouble to do so, or for some other such reason. In such a case, even if a high-quality audio data stream has been recorded, and the high-quality audio data stream can be processed by the amplifier so that an audio signal can be outputted to the speaker, the conventional optical disk device reproduces the default low-quality audio data stream that is preset by the control program recorded on the optical disk. Accordingly, with the conventional optical disk device, low-quality audio is sometimes reproduced even if a high-quality audio data stream has been recorded, and the high-quality audio data stream can be processed by the amplifier so that the audio signal can be outputted to the speaker.

SUMMARY

The present invention was conceived in light of the above-mentioned problems. One object of the present invention is to provide an optical disk device with which audio can be reproduced with an adequate acoustic quality without users having to select the acoustic quality.

In accordance with one aspect of the present invention, an optical disk device includes a reproduction component, an output component and a control component. The reproduction component is configured to direct a laser beam at an optical disk that is loaded in the optical disk device with the optical disk storing a plurality of audio data streams in a plurality of different acoustic qualities. The reproduction component is further configured to reproduce one of the audio data streams. The output component is configured to output the one of the audio data streams reproduced by the reproduction component to an amplifier that is configured to be electrically connected to the optical disk device. The amplifier is further configured to output audio signal to a speaker based on the one of the audio data streams. The control component is configured to acquire from the amplifier first audio format information indicating audio formats to which the amplifier corresponds, and is configured to acquire from the reproduction component second audio format information indicating audio formats of the audio data streams stored in the optical disk. The control component is further configured to determine out of the audio data streams stored in the optical disk the one of the audio data streams with an audio format that belongs to both the first audio format information and the second audio format information. The control component is further configured to issue a command to the reproduction component to reproduce the one of the audio data streams.

With the optical disk device of the present invention, it is possible to provide an optical disk device with which audio can be reproduced with an adequate acoustic quality without users having to select the acoustic quality.

BRIEF DESCRIPTION OF THE DRAWINGS

Referring now to the attached drawings which form a part of this original disclosure:

FIG. 3 is a flowchart illustrating an operation when power to controllers of the optical disk device and the AV amplifier turns on;

FIG. 6 is a diagram illustrating contents of control information expanded in the RAM of the optical disk device.

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1:
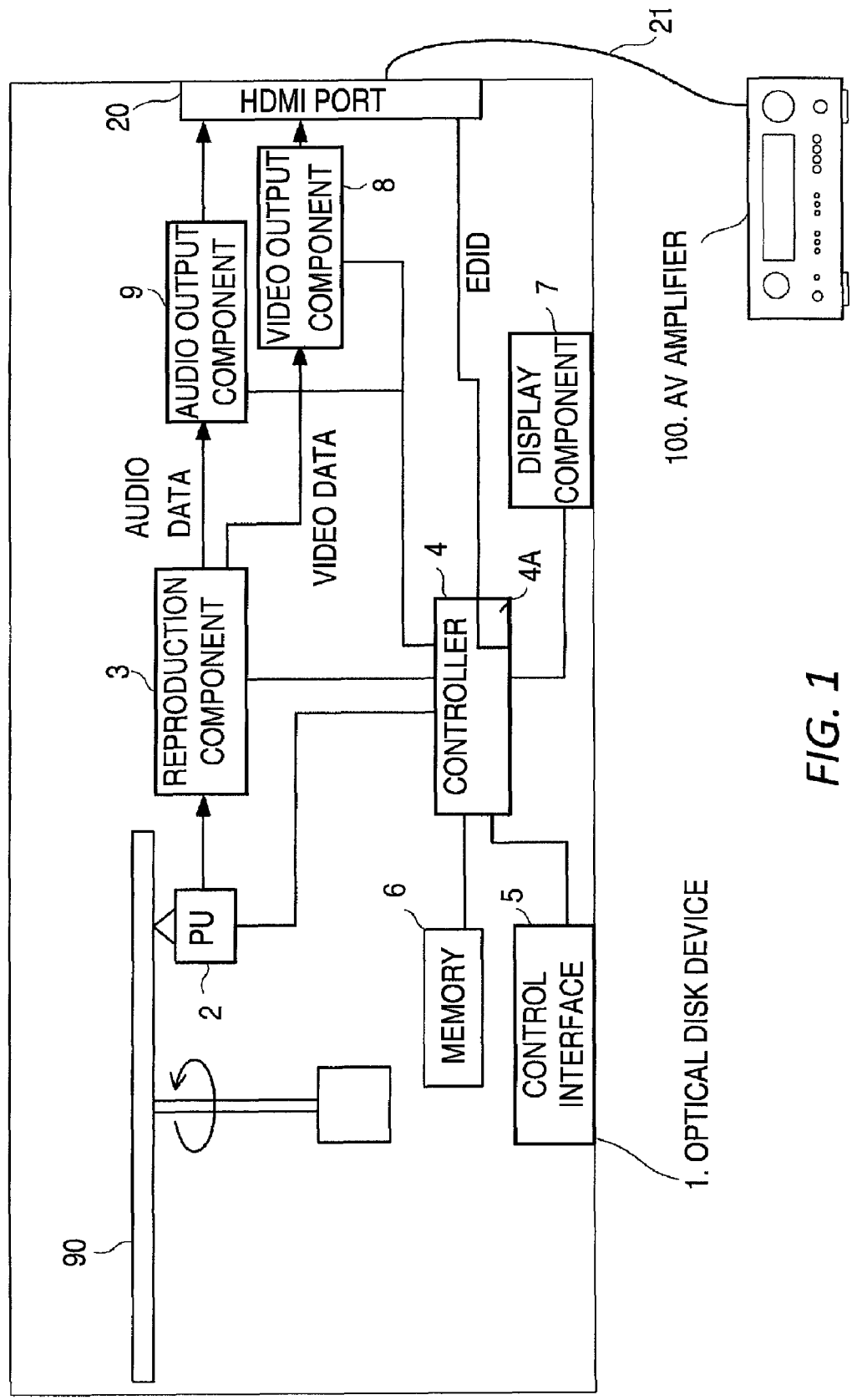
FIG. 1 is a block diagram illustrating an optical disk device in accordance with one embodiment of the present invention.

FIG. 1 is a block diagram illustrating an optical disk device 1. The optical disk device 1 includes a pickup head 2, a reproduction component 3, a controller (e.g., control component) 4, a control interface (e.g., selection component) 5, a memory 6, a display component 7, a video output component 8, an audio output component (e.g., output component) 9, and an HDMI (High-Definition Multimedia Interface) port 20. The pickup head 2 reads data from an optical disk 90 that is loaded in a device main body of the optical disk device 1. The reproduction component 3 has an RF amplifier. The controller 4 controls operations of the various components of the device main body of the optical disk device 1. The control interface 5 handles input operations from users of the optical disk device 1. The memory 6 stores data. The display component 7 displays information. The video output component 8 outputs video signals (or image signals). The audio output component 9 outputs audio signals.

The optical disk 90 includes a Blu-ray disc. The optical disk device 1 includes a Blu-ray player that plays the Blu-ray disc. On the optical disk 90 are recorded menu content including menu screens, and main content including a foreign movie, etc. Furthermore, audio in a plurality of different acoustic qualities for the main content has been recorded to the optical disk 90 (e.g., optical disc authoring), as a plurality of audio data streams (e.g., soundtracks). The audio in a plurality of different acoustic qualities includes DTS-HD Master Audio of the highest acoustic quality, Dolby TrueHD of the second-highest quality, and so forth. The audio data streams are recorded to the optical disk 90 in order to allow the reproduction of audio in a plurality of acoustic qualities and a plurality of languages.

The optical disk device 1 is connected to an HDMI compatible audio-visual amplifier (e.g., AV amplifier) 100 via an HDMI cable 21 that is plugged into the HDMI port 20. The optical disk device 1 and the AV amplifier 100 correspond to a reproduction system.

The pickup head 2 and the reproduction component 3 correspond to "reproduction means". The HDMI port 20 and the HDMI cable 21 correspond to an "interface". The audio output component 9 corresponds to "output means". The AV amplifier 100 corresponds to an "amplifier".

HDMI stands for High Definition Multimedia Interface, and is a bidirectional interface for sending digital AV signals from a Blu-ray player or other such optical disk device to a television receiver, an amplifier, or another such output device. HDMI is an expanded version of DVI (Digital Visual Interface for computer) ver. 1.0, which is a conventional standard. More specifically, DVI is a standard for sending only video information. HDMI is a standard that allows the sending of not only video information, but also audio information and other information all on the same cable. Furthermore, HDMI allows the transmission of high-quality multi-channel audio and high-resolution image signals (or video signals) of various formats. HDMI allows the transmission of information that is sent by the AV amplifier 100 to the optical disk device 1, by DDC (Display Date Channel). DDC is the name of a communications format.

The pickup head 2 includes a laser diode (LD), a collimator lens, a beam splitter, an objective lens, a photodetector, a thread motor, and a biaxial actuator (not shown).

The pickup head 2 is movably attached along an axis extending in the radial direction of the optical disk 90. The thread motor moves the pickup head 2 in the radial direction of the optical disk 90. The LD is a light source that outputs a laser beam. The photodetector includes a plurality of light receiving elements, and detects light reflected from the optical disk 90. The objective lens adjusts the position of the laser beam on the optical disk 90 to which the laser beam is directed. The biaxial actuator moves the objective lens away from the optical disk 90 and in the radial direction of the optical disk 90.

First, a reproduction operation in the optical disk device 1 will be described.

The pickup head 2 directs a laser beam of reading power at the optical disk 90, and the reflected light from the optical disk 90 is detected by the photodetector. Consequently, the video data (or image data) recorded on the optical disk 90 is read optically. Of the plurality of audio data streams recorded to the optical disk 90, the one selected by the controller 4 is read optically.

The reproduction component 3 produces an RF signal based on the output of a plurality of light receiving elements in the pickup head 2, and amplifies the RF signal. The reproduction component 3 then processes the RF signal, takes out and decodes the video data and the selected audio data stream. The video data is encoded by MPEG, for example. The audio data stream that is taken out is encoded by Dolby Digital or DTS, for example. The reproduction component 3 then outputs the audio data stream to the audio output component 9 and the video data to the video output component 8 while synchronizing the two groups of data.

The video output component 8 outputs expanded (or decoded) video data as a digital reproduced video signal to the AV amplifier 100 in the format set by the controller 4.

Meanwhile, the audio output component 9 outputs expanded (or decoded) audio data stream as a digital reproduced audio signal to the external AV amplifier 100. For example, if audio format of the audio data streams recorded to the optical disk 90 is DTS-HD Master Audio or Dolby TrueHD, and the AV amplifier 100 is compatible with the audio format, then, the audio output component 9 outputs a reproduced audio signal corresponding to a 7.1CH surround system to the AV amplifier 100. This reproduced audio signal is such that a stream signal FL-FR including a front L-R signal component, a stream signal SL-SR including a surround L-R signal component, a stream signal SBL-SBR including a surround L-R signal component, and a stream signal C-SW including a center C and a subwoofer SW signal component are multiplexed in time series (e.g., time-division multiplex).

The audio output component 9 and the video output component 8 are linked to the AV amplifier 100 via the HDMI cable 21, which is plugged into the HDMI port 20. The audio output component 9 and the video output component 8 send the digital signal through the HDMI cable 21 to the AV amplifier 100 in TMDS (Transition Minimized Differential Sampling) format.

Figure 2:
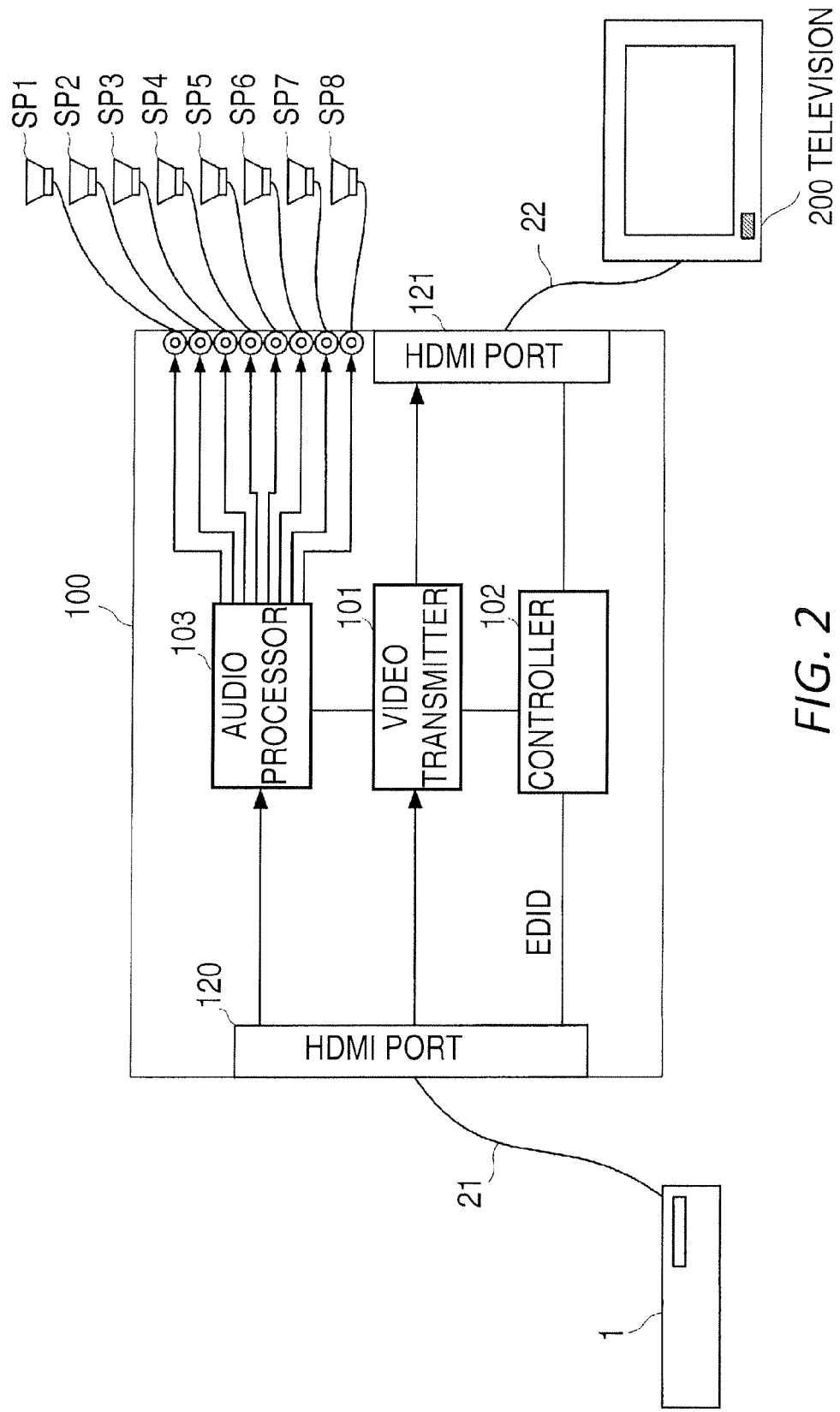
FIG. 2 is a block diagram illustrating an AV amplifier.

FIG. 2 is a block diagram illustrating the AV amplifier 100. The AV amplifier 100 includes HDMI ports 120, 121, a video transmitter 101, a controller 102, and an audio processor 103. The HDMI port 120 is connected to the HDMI cable 21. The HDMI port 121 is connected to an HDMI cable 22. The video transmitter 101 sends a reproduced video signal inputted from the HDMI port 120 to the HDMI port 121. The audio processor 103 processes and sends the reproduced audio signal inputted from the HDMI port 120. The controller 102 controls operations of the various components of the AV amplifier 100. The AV amplifier 100 is connected to a plurality of speakers SP1 to SP8 that outputs sound after processing the reproduced audio signal sent from the audio processor 103. The AV amplifier 100 is also connected to a television 200 that displays video (or image) after processing the reproduced video signal sent through the HDMI cable 22 from the video transmitter 101. The television 200 is a digital television that is compatible with HDMI.

The video transmitter 101 sends the reproduced video signal inputted through the HDMI cable 21 to the HDMI port 120 from the HDMI port 121 to the television 200.

Meanwhile, the audio processor 103 allocates the reproduced audio signal inputted through the HDMI cable 21 to the HDMI port 120 into various stream signals. The audio processor 103 subjects the various stream signals to D/A conversion, amplification, and so on, and outputs audio signals corresponding to the various stream signals to the speakers SP1 to SP8. The speakers SP1 to SP8 output audio based on the inputted audio signal.

The configuration allows the user to view the video displayed on the television 200 and listen to the 7.1CH audio outputted from the speakers SP1 to SP8.

The control interface 5 of the optical disk device 1 is provided with a plurality of keys (not shown) for inputting various commands to the optical disk device 1. The keys include a play key, a title select key, an acoustic quality select key, a language setting key, a mix key, and a power key. The play key executes reproduction of the optical disk 90. The title select key handles the selection of the title to be reproduced. The acoustic quality select key handles the selection of the acoustic quality to be reproduced. The language setting key handles the setting of language in display on the display component 7 or OSD (On-Screen Display). The mix key switches a mix setting (discussed below) on and off. The power key switches the power on and off to the optical disk device 1. The command inputted by the user to the optical disk device 1 is sent to the controller 4. Language settings and mix settings (on or off) are stored by the controller 4 in the memory 6. Here, the control interface 5 can be a remote having the above-mentioned keys.

The memory 6 includes an EEPROM, for example. The memory 6 stores control programs describing how to control the various components of the optical disk device 1. The memory 6 further stores the language settings that indicate a language as language preference of the optical disk device.

The HDMI port 20 detects whether or not the optical disk device 1 and the AV amplifier 100 are connected by the HDMI cable 21. More specifically, the HDMI cable 21 has an HPD (Hot Plug Detector) function, and information about connection is received from the HPD. The HDMI port 20 sends information about connection received from the HPD to the controller 4 via an internal communication line of the device main body of the optical disk device 1. The HDMI port 120 of the AV amplifier 100 has the same configuration as the HDMI port 20.

The controller 4 includes a microprocessor, for example. The controller 4 has a built-in RAM 4A serving as a work field for expanding data processed by the control programs. The controller 4 controls the various components of the optical disk device 1 according to commands inputted by the user to the optical disk device 1. Also, the controller 4 communicates with the controller 102 of the AV amplifier 100 via the HDMI cable 21.

Figure 3:
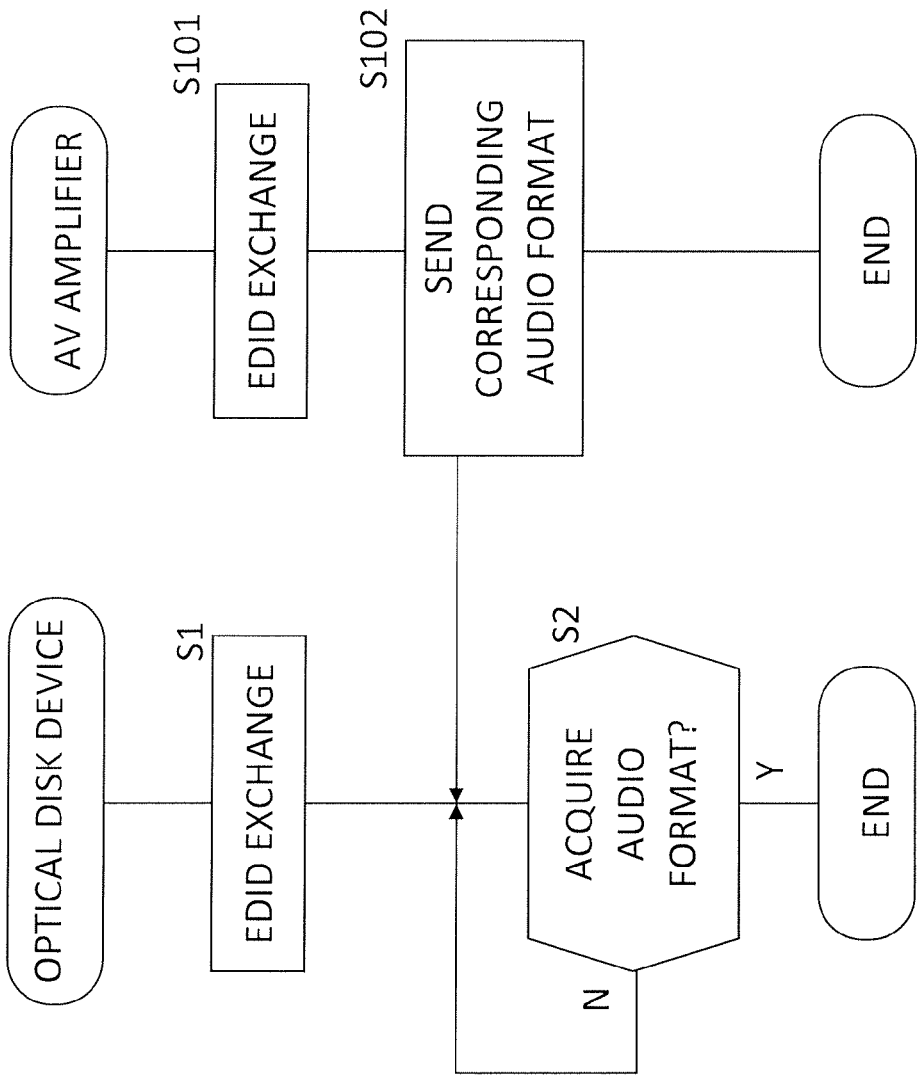
Figure 4:
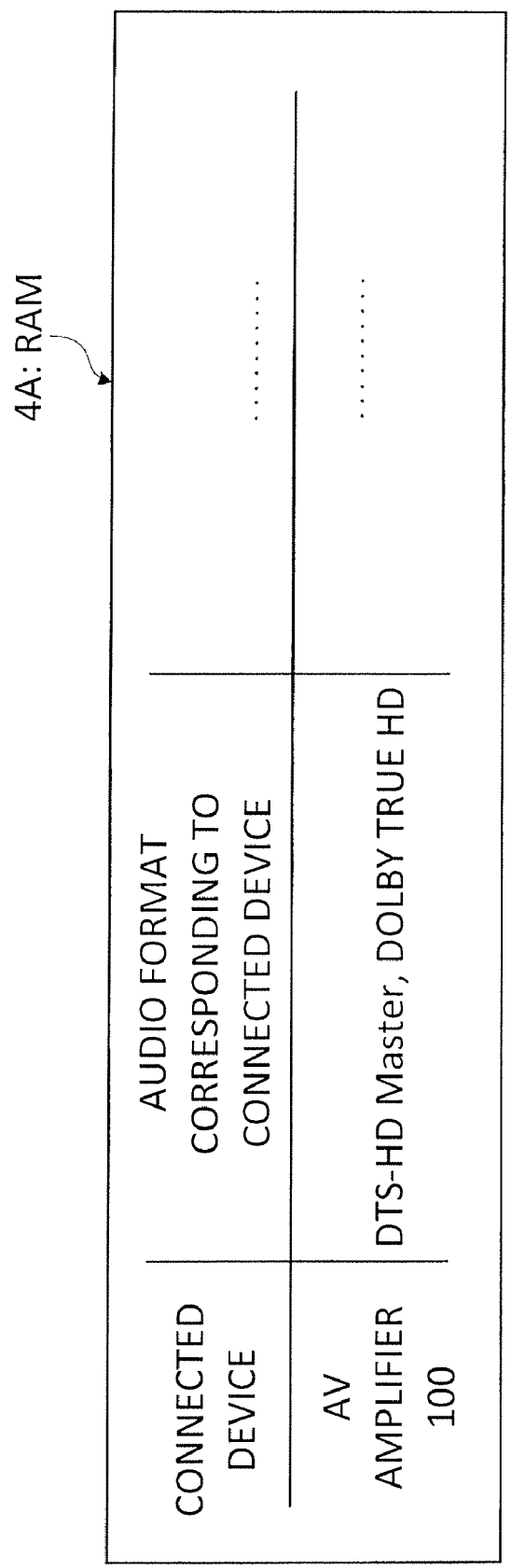
FIG. 4 is a diagram illustrating contents of EDID expanded on a RAM of the optical disk device.

FIG. 3 is a flowchart illustrating an operation when power to the controller 4 of the optical disk device 1 and the controller 102 of the AV amplifier 100 turns on. FIG. 4 is a diagram illustrating contents of EDID (Extended Display Identification Data) expanded on the RAM 4A of the controller 4.

When the power key of the control interface 5 is pressed, the controllers 4 and 102 detect the connection between the optical disk device 1 and the AV amplifier 100, and exchange EDID via the HDMI cable 21 (Step S1, S101). In the exchange of EDID, the controller 102 of the AV amplifier 100 sends EDID that has been stored ahead of time in a ROM (not shown) from the HDMI port 120, through the HDMI cable 21, to the controller 4 of the optical disk device 1 (Step S102). The controller 102 then goes into standby mode in which it awaits an input signal from the optical disk device 1. The EDID includes information indicating the specifications of the AV amplifier 100. Specifically, the EDID from the AV amplifier 100 includes first audio format information indicating the audio formats corresponding to the connected device (i.e., AV amplifier 100) as shown in FIG. 4.

When the EDID from the AV amplifier 100 is received at the HDMI port 20 of the optical disk device 1 by the EDID exchange, the EDID is expanded in the RAM 4A of the controller 4 (Yes in S2). Consequently, the controller 4 recognizes the audio formats corresponding to the AV amplifier 100 (see FIG. 3). The controller 4 then goes into standby mode in which it awaits control input from the user.

Figure 5:
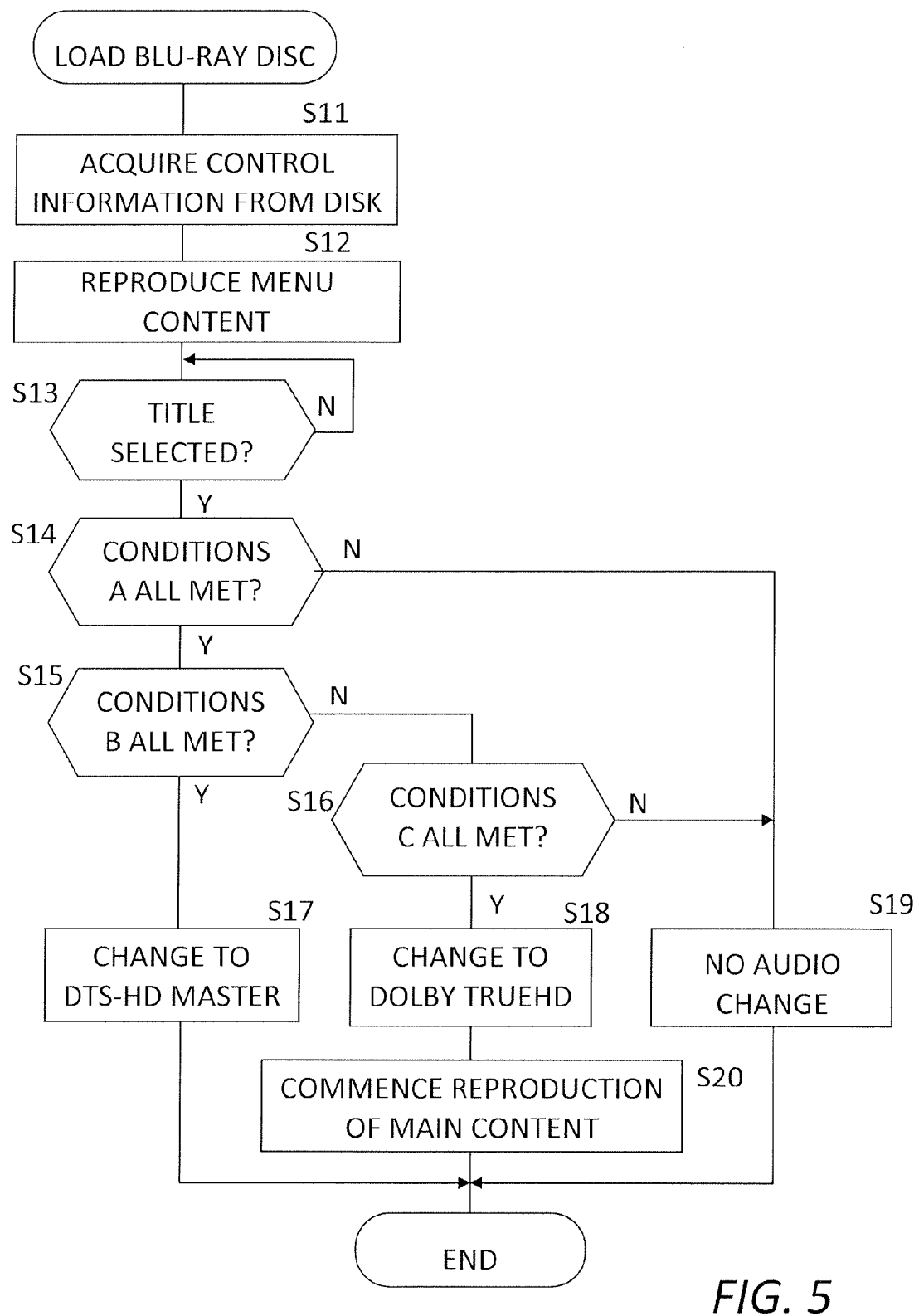
FIG. 5 is a flowchart illustrating an operation of the controller of the optical disk device when an optical disk is loaded.

FIG. 5 is a flowchart illustrating an operation of the controller 4 of the optical disk device 1 when the optical disk 90 is loaded in the optical disk device, or when the power key of the control interface 5 is pressed while the optical disk 90 has been loaded in the optical disk device 1. FIG. 6 is a diagram illustrating contents of control information expanded in the RAM 4A of the controller 4. When the optical disk 90 (e.g., Blu-ray disc) is loaded into the device main body of the optical disk device 1, or when power is switched on to the device main body of the optical disk device 1 in a state in which the optical disk 90 has been loaded, then the controller 4 executes an audio change processing shown in FIG. 5.

The controller 4 controls the pickup head 2 to read control information including control programs from the optical disk 90, and acquires control information via the reproduction component 3 (Step S11). The control information from the optical disk 90 includes second audio format information indicating the audio formats corresponding to the optical disk 90, as shown in FIG. 6. The control information is expanded in the RAM 4A of the controller 4. The controller 4 recognizes the audio formats of the audio data streams recorded to the optical disk 90 based on the control information (see FIG. 6). If the optical disk 90 includes an audio data stream in Japanese that is coded with DTS-HD Master Audio, an audio data stream in Japanese that is coded with Dolby TrueHD, and an audio data stream in English that is coded with Dolby TrueHD, then the controller 4 retrieves contents of the control information (e.g., second audio format information) shown in FIG. 6. In FIG. 6, the symbol "○" (circle) in the table indicates that there is an audio data stream that is coded with the audio format shown in the leftmost column in the language shown in the uppermost line, and the symbol "×" in the table indicates that there is not an audio data stream that is coded with the audio format shown in the leftmost column in the language shown in the uppermost line. Specifically, when the controller 4 retrieves the contents of the control information shown in FIG. 6, the controller 4 recognizes that there is not an audio data stream that is coded with DTS-HD Master Audio in English in the optical disk 90.

The controller 4 reproduces the menu content before reproducing the main content (Step S12). Consequently, a menu screen asking for the selection of the title to be reproduced from among all the titles that the main content includes is displayed on the television 200. Consequently, in Step S12, the user can select the title to be reproduced by pressing the title select key of the control interface 5, and can select the acoustic quality at which the main content is to be reproduced by pressing the acoustic quality select key of the control interface 5.

When the title to be reproduced is selected with the title select key of the control interface 5 ("Yes" in Step S13), the controller 4 determines whether or not conditions A have all been met (Step S14). The conditions A include first and second conditions. The first condition is a condition that the acoustic quality to be reproduced has not been selected with the acoustic quality select key of the control interface (that is, the reproduction is performed at a default acoustic quality). The second condition is a condition that the audio reproduced by the predetermined default setting of the control program recorded to the optical disk 90 is neither DTS-HD Master Audio nor Dolby TrueHD (that is, the default acoustic quality is neither DTS-HD Master Audio nor Dolby TrueHD).

When the acoustic quality to be reproduced has been selected with the acoustic quality select key of the control interface 5 ("No" in Step S14), the controller 4 controls the pickup head 2 to read during reproduction the audio data stream corresponding to the acoustic quality selected with the acoustic quality select key of the control interface 5 (Step S19). The controller 4 then commences the reproduction of the title selected in Step S13 (e.g., the main content) (Step S20). In this case, the content (e.g., the audio data stream of the main content) is reproduced at the acoustic quality selected by the user according to preference.

Also, even if the acoustic quality to be reproduced has not been selected with the acoustic quality select key of the control interface 5, if the audio reproduced by default is either DTS-HD Master Audio or Dolby TrueHD ("No" in Step S14), the controller 4 controls the pickup head 2 to read during reproduction the audio data stream with the default acoustic quality (i.e., the audio data stream for DTS-HD Master Audio or the audio data stream for Dolby TrueHD) (Step S19). The controller 4 then commences the reproduction of the title selected in Step S13 (e.g., the main content) (Step S20). In this case, the acoustic quality is not selected by the user according to preference, but the audio is reproduced at high acoustic quality (e.g., DTS-HD Master Audio or Dolby TrueHD). Accordingly, the controller 4 decides that it is unnecessary to change the acoustic quality.

If the conditions A have all been met ("Yes" in Step S14), that is, if the acoustic quality to be reproduced has not be selected with the acoustic quality select key of the control interface 5 and the audio reproduced by default is neither DTS-HD Master Audio nor Dolby TrueHD, then the process by the controller 4 proceeds to Step S15 to reproduce the audio with adequate acoustic quality or to prevent the audio with low acoustic quality from being reproduced.

The controller 4 determines whether or not conditions B have all been met (Step S15). The conditions B include first to third conditions. The first condition is a condition that the language of the audio data stream for DTS-HD Master Audio is the same as the language set with the language setting key of the control interface 5 on the setup screen of the optical disk device 1. The second condition is a condition that there is HDMI connection to an AV amplifier (e.g., AV amplifier 100) that is compatible with DTS-HD Master Audio. The third condition is a condition that the mix setting has been switched off. The mix setting is a setting in which a main audio, a sub audio and an interactive audio of the audio data stream are mixed and outputted. The main audio of the audio data stream includes a main audio (e.g., dialogue and sound) of a movie (e.g., the main content), for example. The sub audio of the audio data stream includes an audio commentary, such as comments by the director of the movie. The interactive audio of the audio data stream includes sound effects. Here, of the determinations in Step S15, determining whether or not the language of the audio data stream for DTS-HD Master Audio is the same as the set language (i.e., the first condition) is performed by referring to the storage content of the memory 6 (e.g., language setting) and to the second audio format information in the RAM 4A shown in FIG. 6. Also, determining whether or not there is HDMI connection to an AV amplifier that is compatible with DTS-HD Master Audio (i.e., the second condition) is performed by referring to EDID (i.e., the first audio format information) in the RAM 4A of the controller 4.

If the conditions B have all been met ("Yes" in Step S15), the controller 4 controls the pickup head 2 to read during reproduction the audio data stream for DTS-HD Master Audio, which has the highest acoustic quality of the formats in which the first audio format information shown in FIG. 4 and the second audio format information shown in FIG. 6 match up (Step S17). In other words, the controller 4 determines the audio data stream with an audio format (i.e., DTS-HD Master Audio) that belongs to both the first audio format information and the second audio format information, and that has the highest acoustic quality within audio formats that that belongs to both the first audio format information and the second audio format information. Furthermore, the audio format of the audio data stream determined by the controller 4 has the highest audio quality within the audio formats of the audio data streams whose language is the same as the language indicated by the language setting that is stored in the memory 6. The controller 4 then commences the reproduction of the title selected in Step S13 (e.g., the main content) (Step S20). In this case, the acoustic quality to be reproduced is not selected by the user, but the optical disk device 1 reproduces the main content in high-quality DTS-HD Master Audio after setting the acoustic quality to be reproduced to DTS-HD Master Audio.

On the other hand, if the conditions B have not all been met ("No" in Step S15), the process of the controller 4 moves on to Step S16. That is, if the language of the audio data stream for DTS-HD Master Audio is not the same as the language set with the language setting key of the control interface 5 on the setup screen of the optical disk device 1, such as when the language for DTS-HD Master Audio is Japanese and the set language is English (see FIG. 6), the process of the controller 4 moves to Step S16. The process of the controller 4 also moves to Step S16 if there is no HDMI connection to an AV amplifier that is compatible with DTS-HD Master Audio (or if the AV amplifier 100 is not compatible with DTS-HD Master Audio), or if the mix setting has been switched on.

The controller 4 then determines whether or not conditions C have all been met (Step S16). The conditions C include first to third conditions. The first condition is a condition that the language of the audio data stream for Dolby TrueHD is the same as the language set with the language setting key of the control interface 5 on the setup screen of the optical disk device 1. The second condition is a condition that there is HDMI connection to an AV amplifier (e.g., AV amplifier 100) that is compatible with Dolby TrueHD. The third condition is a condition that the mix setting has been switched off. In Step S16, the determinations of the first to third conditions of the conditions C are made by the same method as the determinations in Step S15. Specifically, determining whether or not the language of the audio data stream for Dolby TrueHD is the same as the set language (i.e., the first condition) is performed by referring to the storage content of the memory 6 (e.g., language setting) and to the second audio format information in the RAM 4A shown in FIG. 6. Also, determining whether or not there is HDMI connection to an AV amplifier that is compatible with Dolby TrueHD is performed by referring to EDID (i.e., the first audio format information) in the RAM 4A of the controller 4.

If the conditions C have not all been met ("No" in Step S16), the process of the controller 4 moves to Steps S19 and S20 in that order. That is, if the language of the audio data stream for Dolby TrueHD is not the same as the set language, the controller 4 commences the reproduction of the title selected in S13 (e.g., the main content) at the default acoustic quality (Steps S19, S20). Similarly, if there is no HDMI connection to an AV amplifier that is compatible with Dolby TrueHD (or if the AV amplifier 100 is not compatible with Dolby TrueHD), then the controller 4 commences the reproduction of the title selected in S13 (e.g., the main content) at the default acoustic quality (Steps S19, S20). Furthermore, the controller 4 commences the reproduction of the title selected in S13 (e.g., the main content) at the mix setting if the mix setting has been switched on ahead of time (S19, S20).

On the other hand, if the conditions C have all been met ("Yes" in Step S16), the controller 4 controls the pickup head 2 to read during reproduction the audio data stream for Dolby TrueHD, which has the highest acoustic quality of the formats in which the first audio format information and the second audio format information match up (Step S18). In other words, the controller 4 determines the audio data stream with an audio format (i.e., Dolby TrueHD) that belongs to both the first audio format information and the second audio format information, and that has the highest acoustic quality within audio formats that that belongs to both the first audio format information and the second audio format information. Furthermore, the audio format of the audio data stream determined by the controller 4 has the highest audio quality within the audio formats of the audio data streams whose language is the same as the language indicated by the language setting that is stored in the memory 6. The controller 4 then commences the reproduction of the title selected in S13 (e.g., the main content) (Step S20). In this case, the acoustic quality to be reproduced is not selected by the user, but the optical disk device 1 reproduces the main content in Dolby TrueHD of the second highest acoustic quality.

Thus, with the optical disk device 1, the audio format corresponding to the AV amplifier 100 is checked via HDMI interface, and high-quality audio can be automatically reproduced, without the user having to select the acoustic quality to be reproduced. Therefore, the user can listen to the content of the optical disk 90 in high-quality audio, without having to select the acoustic quality to be reproduced.

Also, in Steps S15 to S18, prior to the start of reproduction of the main content (Step S20), a change is made to high-acoustic quality DTS-HD Master Audio or Dolby TrueHD after it has been confirmed that the language of the audio data stream to be reproduced is the same as the language set with the language setting key of the control interface 5 on the setup screen of the optical disk device 1. This prevents the audio from being reproduced in a language undesired by the user.

The optical disk device 1 includes reproduction means (e.g., the pickup head 2, the reproduction component 3), output means (e.g., audio output component 9), selection means (control interface 5), and control means (controller 4). The reproduction means directs the laser beam at the optical disk 90 on which audio in a plurality of different acoustic qualities has been recorded as the audio data streams, and reproduces the audio data stream selected from among the plurality of audio data streams recorded to the optical disk 90. The output means is connected via a bidirectional interface (e.g., HDMI interface) to the AV amplifier 100 that outputs audio signals to the speakers SP1 to SP8. The output means transmits the audio data stream reproduced by the reproduction means to the AV amplifier 100 via the interface. The selection means handles the selection of the audio data stream to be reproduced by the reproduction means. The control means communicates with the AV amplifier 100 via the interface prior to the reproduction of the audio data stream, and acquires the first audio format information indicating the audio format of the audio data stream to which the AV amplifier 100 corresponds. The reproduction means reads the second audio format information indicating the audio format of the plurality of audio data streams recorded to the optical disk 90, and transmits the information to the control means prior to the reproduction of the audio data stream. When the optical disk 90 is placed in the device main body of the optical disk device 1, or when the power is switched on to the device main body of the optical disk device 1 in a state in which the optical disk 90 has been placed, then the control means determines whether or not the audio data stream reproduced by the reproduction means was selected by the selection means. If it has been determined that the audio data stream reproduced by the reproduction means has not been selected by the selection means, then the control means issues a command to the reproduction means so that the audio data stream of the highest acoustic quality within the format in which the first audio format information and the second audio format information match up is selected during reproduction.

With the optical disk device 1, the control means acquires the first audio format information and the second audio format information prior to the reproduction of the audio data stream. Examples of types of audio format include DTS-HD Master Audio and Dolby TrueHD. When the optical disk 90 is placed in the device main body of the optical disk device 1, or when the power is switched on to the device main body of the optical disk device 1 in a state in which the optical disk 90 has been loaded, then the control means determines whether or not the user has selected the audio data stream with the selection means. If it is determined that no audio data stream has been selected with the selection means, then the control means issues a command to the reproduction means so that the audio data stream of the highest acoustic quality within the format in which the first audio format information and the second audio format information match up is selected during reproduction. As a result, the reproduction means reproduces the audio data stream selected by the control means from among the plurality of audio data streams recorded to the optical disk 90. Consequently, high-quality audio is outputted from the speakers SP1 to SP8.

With the optical disk device 1, therefore, the audio format corresponding to the AV amplifier 100 is checked via the bidirectional interface, and high-quality audio is automatically reproduced, without the user having to select the acoustic quality to be reproduced.

Furthermore, the optical disk device 1 includes memory means (e.g., memory 6). The memory means registers the language used by the device main body of the optical disk device 1. Moreover, the optical disk 90 records audio in a plurality of different languages as the audio data streams. If it is determined that the audio data stream reproduced by the reproduction means has not been selected by the selection means, then the control means issues a command to the reproduction means so that the audio data stream of the highest acoustic quality in the language registered in the memory means within the format in which the first audio format information and the second audio format information match up is selected during reproduction.

The optical disk device 1 is designed so that the user performs settings for subtitle language and so forth on the setup screen (e.g., initial setting screen). The memory means stores the language settings thus made. The control means issues a command to the reproduction means so that an audio data stream of the same language as the set language is selected during reproduction. This prevents audio from being reproduced in a language the user does not want.

With the optical disk device 1, the user can listen to the content of the optical disk 90 in high-quality audio, without having to select the acoustic quality to be reproduced.

With the optical disk device 1, the optical disk 90 includes a Blu-ray disc. However, the optical disk 90 can include a CD, DVD, or HD DVD. In case of a Blu-ray disc, the optical disk 90 can include audio data streams coded with Dolby Digital (AC-3), DTS (Digital Theater System), and linear PCM (Pulse Code Modulation) as well as DTS-HD Master Audio and Dolby TrueHD. Furthermore, the optical disk 90 can also include audio data streams coded with Dolby Digital Plus and DTS-HD High Resolution Audio.

With the optical disk device 1, when the user selects the acoustic quality to be reproduced with the acoustic quality select key of the control interface 5, the controller 4 can optionally notify to the user a recommended acoustic quality setting that indicates that the AV amplifier 100 corresponds to a higher quality audio than the acoustic quality selected by the user. Specifically, when the user selects the acoustic quality with the acoustic quality select key, then the controller 4 determines if the user selects an acoustic quality other than DTS-HD Master Audio and Dolby TrueHD. If the controller 4 determines that the user selects an acoustic quality other than DTS-HD Master Audio and Dolby TrueHD, then the controller 4 determines if the AV amplifier 100 corresponds to one of DTS-HD Master Audio and Dolby TrueHD based on the first audio format information stored in the RAM 4A. If the controller 4 determines that the AV amplifier 100 corresponds to one of DTS-HD Master Audio and Dolby TrueHD, then the controller 4 displays on the display component 7 the recommended acoustic quality setting that indicates that the AV amplifier 100 corresponds to one of DTS-HD Master Audio and Dolby TrueHD.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only a preferred embodiment has been chosen to illustrate the present invention, it will be apparent to those skilled in the art from this disclosure that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Thus, the foregoing descriptions of the embodiment according to the present invention are provided for illustration only, and not for the purpose of limiting the invention as defined by the appended claims and their equivalents.

What is claimed is:

1. An optical disk device, comprising:
 a reproduction component configured to direct a laser beam at an optical disk that is loaded in the optical disk device with the optical disk storing a plurality of audio data streams in a plurality of different acoustic qualities, the reproduction component being further configured to reproduce one of the audio data streams;
 an output component configured to output the one of the audio data streams reproduced by the reproduction component to an amplifier that is configured to be electrically connected to the optical disk device, the amplifier being further configured to output audio signal to a speaker based on the one of the audio data streams; and
 a control component configured to acquire from the amplifier first audio format information indicating audio formats to which the amplifier corresponds, and configured to acquire from the reproduction component second audio format information indicating audio formats of the audio data streams stored in the optical disk,
 the control component being further configured to determine whether or not a default acoustic quality determined by a predetermined default setting of a control program recorded to the optical disk matches a predetermined high acoustic quality, the control component being further configured to determine out of the audio data streams stored in the optical disk the one of the audio data streams with an audio format that belongs to both the first audio format information and the second audio format information only when the control component determines that the default acoustic quality does not match the predetermined high acoustic quality, the control component being further configured to issue a command to the reproduction component to reproduce the one of the audio data streams.

2. The optical disk device according to claim 1, wherein the control component is further configured to determine the one of the audio data streams with the audio format that has the highest acoustic quality within audio formats that belong to both the first audio format information and the second audio format information.

3. The optical disk device according to claim 1, further comprising
 a selection component configured to select the one of the audio data streams to be reproduced by the reproduction component,
 the control component being further configured to determine whether or not the one of the audio data streams to be reproduced by the reproduction component has been selected by the selection component when the optical disk is loaded in the optical disk device, or when power to the optical disk device turns on while the optical disk has been loaded in the optical disk device,
 the control component being further configured to determine the one of the audio data streams with the audio format that belongs to both the first audio format information and the second audio format information if the control component determines that the one of the audio data streams to be reproduced by the reproduction component has not been selected by the selection component.

4. The optical disk device according to claim 3, wherein the control component is further configured to determine the one of the audio data streams with the audio format that has the highest acoustic quality within the audio formats that belong to both the first audio format information and the second audio format information if the control component determines that the one of the audio data streams to be reproduced by the reproduction component has not been selected by the selection component.

5. The optical disk device according to claim 1, wherein
the output component is configured to be electrically connected to the amplifier via a bidirectional interface,
the control component is configured to acquire the first audio format information by communicating with the amplifier via the bidirectional interface prior to the reproduction component reproducing the one of the audio data streams determined by the control component, and
the control component is further configured to acquire the second audio format information by receiving from the reproduction component the second audio format information that is stored in the optical disc and is reproduced by the reproduction component prior to the reproduction component reproducing the one of the audio data streams determined by the control component.

6. The optical disk device according to claim 5, wherein
the reproduction component is configured to direct the laser beam at a Blu-ray disc, which corresponds to the optical disk, and
the output component is configured to be electrically connected to an AV (Audio Visual) amplifier, which corresponds to the amplifier, via an HDMI (High-Definition Multimedia Interface), which corresponds to the bidirectional interface.

7. The optical disk device according to claim 1, further comprising
a memory configured to store language setting that indicates a language as language preference of the optical disk device,
the control component being configured to acquire the second audio format information that further indicates a language of each of the audio data streams stored in the optical disk,
the control component being further configured to determine the one of the audio data streams with the audio format that has the highest audio quality within the audio formats of the audio data streams whose language is the same as the language indicated by the language setting that is stored in the memory.

8. The optical disk device according to claim 7, further comprising
a selection component configured to select the one of the audio data streams to be reproduced by the reproduction component,
the control component being further configured to determine whether or not the one of the audio data streams to be reproduced by the reproduction component has been selected by the selection component when the optical disk is loaded in the optical disk device, or when power to the optical disk device turns on while the optical disk has been loaded in the optical disk device,
the control component being further configured to determine the one of the audio data streams with the audio format that has the highest audio quality within the audio formats of the audio data streams whose language is the same as the language indicated by the language setting that is stored in the memory if the control component determines that the one of the audio data streams to be reproduced by the reproduction component has not been selected by the selection component.

9. The optical disk device according to claim 8, wherein
the output component is configured to be electrically connected to the amplifier via a bidirectional interface,
the control component is configured to acquire the first audio format information by communicating with the amplifier via the bidirectional interface prior to the reproduction component reproducing he one of the audio data streams determined by the control component, and
the control component is further configured to acquire the second audio format information by receiving from the reproduction component the second audio format information that is stored in the optical disc and is reproduced by the reproduction component prior to the reproduction component reproducing the one of the audio data streams determined by the control component.

10. The optical disk device according to claim 9, wherein
the reproduction component is configured to direct the laser beam at a Blu-ray disc, which corresponds to the optical disk, and
the output component is configured to be electrically connected to an AV (Audio Visual) amplifier, which corresponds to the amplifier, via an HDMI (High-Definition Multimedia Interface), which corresponds to the bidirectional interface.

* * * * *